US010100752B2

(12) United States Patent
Ryu et al.

(10) Patent No.: US 10,100,752 B2
(45) Date of Patent: Oct. 16, 2018

(54) SYSTEM AND METHOD FOR CONTROLLING VALVE TIMING OF CONTINUOUS VARIABLE VALVE DURATION ENGINE

(71) Applicant: HYUNDAI MOTOR COMPANY, Seoul (KR)

(72) Inventors: In Sang Ryu, Incheon (KR); Kyoung Pyo Ha, Seongnam-si (KR); You Sang Son, Suwon-si (KR); Kiyoung Kwon, Yongin-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days.

(21) Appl. No.: 15/340,742

(22) Filed: Nov. 1, 2016

(65) Prior Publication Data

US 2017/0268435 A1 Sep. 21, 2017

(30) Foreign Application Priority Data

Mar. 16, 2016 (KR) .......................... 10-2016-0031654

(51) Int. Cl.
*F02D 13/02* (2006.01)
*F01L 1/34* (2006.01)
*F02D 41/00* (2006.01)

(52) U.S. Cl.
CPC ............ *F02D 13/0203* (2013.01); *F01L 1/34* (2013.01); *F02D 13/0261* (2013.01);
(Continued)

(58) Field of Classification Search
CPC .................... F02D 13/0203; F02D 13/0215
See application file for complete search history.

(56) References Cited

U.S. PATENT DOCUMENTS

| 4,552,112 A | 11/1985 | Nagao | F01L 1/26 123/308 |
| 5,080,055 A | 1/1992 | Komatsu | F01L 1/08 123/90.11 |

(Continued)

FOREIGN PATENT DOCUMENTS

| JP | H07-42514 A | 2/1995 |
| JP | 2006-046293 A | 2/2006 |

(Continued)

OTHER PUBLICATIONS

Non-Final Office Action dated May 16, 2018 from the corresponding U.S. Appl. No. 15/258,043, 9 pages.
(Continued)

*Primary Examiner* — Stephen K Cronin
*Assistant Examiner* — Kevin R Steckbauer
(74) *Attorney, Agent, or Firm* — Brinks Gilson & Lione

(57) ABSTRACT

The present disclosure provides a system and a method for controlling valve timing of a continuous variable valve duration engine. The method may include: classifying a plurality of control regions depending on an engine speed and an engine load; applying a maximum duration to an intake valve in a first control region; maintaining the maximum duration of the intake valve and controlling a valve overlap by using exhaust valve closing (EVC) timing in a second control region; advancing intake valve closing (IVC) timing in a third control region; controlling the IVC timing to be close to bottom dead center (BDC) in a fourth control region; controlling a throttle valve to be fully opened and generating a scavenging phenomenon in a fifth control region; and controlling the throttle valve to be fully opened and controlling the IVC timing to prevent knocking in a sixth control region.

2 Claims, 10 Drawing Sheets

(52) U.S. Cl.
CPC ...... *F02D 41/0002* (2013.01); *F02D 13/0215* (2013.01); *F02D 41/0007* (2013.01); *F02D 2041/001* (2013.01); *F02D 2041/002* (2013.01); *F02D 2200/101* (2013.01)

(56) References Cited

U.S. PATENT DOCUMENTS

| | | | | |
|---|---|---|---|---|
| 5,121,733 | A * | 6/1992 | Goto | F02B 27/00 123/559.1 |
| 5,161,497 | A * | 11/1992 | Simko | F02D 13/0219 123/90.15 |
| 5,224,460 | A | 7/1993 | Haystad | F01L 3/10 123/184.54 |
| 5,421,308 | A | 6/1995 | Hitomi | F02B 29/08 123/559.1 |
| 5,429,100 | A * | 7/1995 | Goto | F02B 33/36 123/559.1 |
| 5,450,824 | A | 9/1995 | Yamane | F02D 13/023 123/90.15 |
| 5,469,818 | A | 11/1995 | Yoshioka | F01L 1/34406 123/90.15 |
| 5,622,144 | A | 4/1997 | Nakamura | F01L 1/34406 123/90.15 |
| 5,698,779 | A | 12/1997 | Yoshioka | F02D 13/0215 73/114.32 |
| 5,992,361 | A * | 11/1999 | Murata | F01L 1/356 123/90.15 |
| 6,336,436 | B1 | 1/2002 | Miyakubo et al. | |
| 6,553,949 | B1 * | 4/2003 | Kolmanovsky | F02B 75/045 123/406.21 |
| 6,619,242 | B2 * | 9/2003 | Kaneko | F01L 9/04 123/21 |
| 6,837,199 | B2 * | 1/2005 | Matsuura | F01L 1/022 123/316 |
| 7,793,625 | B2 * | 9/2010 | Nakamura | F01L 1/3442 123/346 |
| 7,823,550 | B2 * | 11/2010 | Murata | F02D 13/0238 123/347 |
| 8,205,587 | B2 * | 6/2012 | Murata | F01L 1/053 123/90.15 |
| 8,235,015 | B2 | 8/2012 | Murata | F01L 1/047 123/90.15 |
| 8,677,957 | B2 * | 3/2014 | Goto | F02D 13/0219 123/179.18 |
| 8,887,691 | B2 | 11/2014 | Chen et al. | |
| 9,863,331 | B2 | 1/2018 | Ryu et al. | |
| 9,863,340 | B2 | 1/2018 | Ryu et al. | |
| 9,874,153 | B2 | 1/2018 | Ryu et al. | |
| 9,874,154 | B2 | 1/2018 | Ryu et al. | |
| 9,879,619 | B2 | 1/2018 | Ryu et al. | |
| 9,889,838 | B2 | 2/2018 | Ryu et al. | |
| 9,903,281 | B2 | 2/2018 | Ryu et al. | |
| 9,932,883 | B2 | 4/2018 | Iwai et al. | |
| 9,932,908 | B2 | 4/2018 | Ryu et al. | |
| 9,964,050 | B2 | 5/2018 | Ryu et al. | |
| 10,006,378 | B2 | 6/2018 | Ryu et al. | |
| 2001/0025615 | A1 | 10/2001 | Nohara | F01L 13/0021 123/90.15 |
| 2001/0050067 | A1 | 12/2001 | Sato | F01L 1/34 123/90.17 |
| 2004/0099244 | A1 * | 5/2004 | Matsuura | F01L 1/022 123/432 |
| 2009/0031973 | A1 * | 2/2009 | Murata | F02D 13/0238 123/90.16 |
| 2009/0272363 | A1 | 11/2009 | Yun et al. | |
| 2010/0217504 | A1 | 8/2010 | Fujii | F01L 1/344 701/105 |
| 2012/0000197 | A1 | 1/2012 | Maruyama et al. | |
| 2012/0004826 | A1 | 1/2012 | Shimo et al. | |
| 2013/0206104 | A1 | 8/2013 | Kuhlmeyer et al. | |
| 2015/0114342 | A1 * | 4/2015 | Iwai | F02D 21/08 123/305 |
| 2015/0167508 | A1 | 6/2015 | Ha | |
| 2015/0167509 | A1 | 6/2015 | Ha | |
| 2017/0082037 | A1 | 3/2017 | Ryu | F01L 13/0015 |
| 2017/0167318 | A1 | 6/2017 | Ryu | F01L 13/0015 |
| 2017/0167393 | A1 | 6/2017 | Ryu | F02D 41/26 |
| 2017/0167394 | A1 | 6/2017 | Ryu | F02D 13/0215 |
| 2017/0167396 | A1 | 6/2017 | Ryu | F02D 41/0002 |
| 2017/0167398 | A1 | 6/2017 | Ryu | F02D 41/0002 |
| 2017/0167399 | A1 | 6/2017 | Ryu | F02D 13/0215 |
| 2017/0167400 | A1 | 6/2017 | Ryu | F02D 13/0215 |
| 2017/0167401 | A1 | 6/2017 | Ryu | F01L 1/34 |
| 2017/0167402 | A1 | 6/2017 | Ryu | B60W 20/10 |
| 2017/0167403 | A1 | 6/2017 | Ryu | B60W 10/06 |
| 2017/0167404 | A1 | 6/2017 | Ryu | F02D 13/0215 |
| 2017/0167405 | A1 | 6/2017 | Ryu | F01L 13/0015 |
| 2017/0167406 | A1 | 6/2017 | Ryu | F01L 1/34 |
| 2017/0167407 | A1 | 6/2017 | Ryu | F01L 1/34 |
| 2017/0167408 | A1 | 6/2017 | Ryu | F02D 41/0002 |
| 2017/0167409 | A1 | 6/2017 | Ryu | F02D 13/0215 |
| 2017/0167414 | A1 | 6/2017 | Ryu | F02B 37/00 |
| 2017/0234243 | A1 | 8/2017 | Ryu | F02D 13/0234 123/350 |
| 2017/0268435 | A1 | 9/2017 | Ryu | F02D 13/0215 |
| 2017/0268436 | A1 | 9/2017 | Ryu | F02D 13/0215 |
| 2017/0268437 | A1 | 9/2017 | Ryu | F01L 1/047 |
| 2018/0100444 | A1 | 4/2018 | Ryu et al. | |
| 2018/0100445 | A1 | 4/2018 | Ryu et al. | |
| 2018/0100446 | A1 | 4/2018 | Ryu et al. | |
| 2018/0100447 | A1 | 4/2018 | Ryu et al. | |
| 2018/0100448 | A1 | 4/2018 | Ryu et al. | |
| 2018/0100452 | A1 | 4/2018 | Ryu et al. | |
| 2018/0100453 | A1 | 4/2018 | Ryu et al. | |
| 2018/0100454 | A1 | 4/2018 | Ryu et al. | |

FOREIGN PATENT DOCUMENTS

| | | |
|---|---|---|
| JP | 2010-216464 A | 9/2010 |
| KR | 10-0321206 B1 | 1/2002 |
| KR | 10-2009-0013007 A | 2/2009 |
| WO | 2013-171830 A1 | 11/2013 |

OTHER PUBLICATIONS

Non-final Office Action dated Aug. 24, 2018 from the corresponding U.S. Appl. No. 15/840,079, 41 pages.

* cited by examiner

SYSTEM AND METHOD FOR CONTROLLING VALVE TIMING OF CONTINUOUS VARIABLE VALVE DURATION ENGINE

CROSS-REFERENCE TO RELATED APPLICATION

This application claims priority to and the benefit of Korean Patent Application No. 10-2016-0031654, filed on Mar. 16, 2016, the entire contents of which are incorporated herein by reference.

FIELD

The present disclosure relates to a system and a method for controlling valve timing of a continuous variable valve duration engine.

BACKGROUND

The statements in this section merely provide background information related to the present disclosure and may not constitute prior art.

An internal combustion engine combusts mixed gas in which fuel and air are mixed at a predetermined ratio through a set ignition mode to generate power by using explosion pressure.

Generally, a camshaft is driven by a timing belt connected with a crankshaft that converts linear motion of a piston by the explosion pressure into rotating motion to actuate an intake valve and an exhaust valve, and while the intake valve is opened, air is suctioned into a combustion chamber, and while an exhaust valve is opened, gas which is combusted in the combustion chamber is exhausted.

To improve the operations of the intake valve and the exhaust valve and thereby improve engine performance, a valve lift and a valve opening/closing time (timing) may be controlled according to a rotational speed or load of an engine. Therefore, a continuous variable valve duration (CVVD) device controlling opening duration of an intake valve and an exhaust valve of the engine and a continuous variable valve timing (CVVT) device controlling opening timing and closing timing of the intake valve and the exhaust valve of the engine have been developed.

The CVVD device adjusts duration of the valve. In addition, the CVVT device advances or retards opening and closing timing of the valve in a state in which the duration of the valve is fixed. In other words, when the opening timing of the valve is determined, the closing timing is automatically determined according to the duration of the valve.

The above information disclosed in this Background section is only for enhancement of understanding of the background of the disclosure and therefore it may contain information that does not form the prior art that is already known to a person of ordinary skill in the art.

Further areas of applicability will become apparent from the description provided herein. It should be understood that the description and specific examples are intended for purposes of illustration only and are not intended to limit the scope of the present disclosure.

SUMMARY

The present disclosure provides a system and a method for controlling valve timing of a continuous variable valve duration engine having advantages of simultaneously controlling duration and timing of the continuous variable valve by mounting a continuous variable valve duration device and a continuous variable valve timing device on an intake and mounting a continuous variable valve timing device on an exhaust in a turbo engine.

A method for controlling valve timing of a turbo engine provided with a continuous variable valve duration (CVVD) device and a continuous variable valve timing (CVVT) device at an intake and a continuous variable valve timing (CVVT) device at an exhaust according to one form of the present disclosure may include: classifying a plurality of control regions depending on an engine speed and an engine load; applying a maximum duration to an intake valve in a first control region; maintaining the maximum duration of the intake valve and controlling a valve overlap by using exhaust valve closing (EVC) timing in a second control region; advancing intake valve closing (IVC) timing in a third control region; controlling the IVC timing to be close to bottom dead center (BDC) in a fourth control region; controlling a throttle valve to be fully opened and generating a scavenging phenomenon in a fifth control region; and controlling the throttle valve to be fully opened and controlling the IVC timing to prevent knocking in a sixth control region.

Intake valve opening (IVO) timing and the IVC timing may be fixed and the EVC timing may be set as a maximum value capable of maintaining combustion stability in the first region.

The valve overlap may be increased by retarding the EVC timing until the engine load reaches a predetermined load and the valve overlap may be reduced by advancing the EVC timing when the engine load is increased over the predetermined load in the second control region.

The IVC timing may be advanced to be close to BDC when the engine speed is less than a predetermined speed and the IVC timing may be advanced to an angle after BDC when the engine speed is equal to or greater than the predetermined speed in the third control region.

Intake valve opening (IVO) timing and the EVC timing may be controlled to be close to top dead center in the fourth control region.

Intake valve opening (IVO) timing may be advanced to an angle before top dead center and the IVC timing may be controlled to an angle after BDC to generate the scavenging phenomenon in the fifth control region.

The EVC timing may be controlled within an angle range after top dead center in the fifth control region.

The EVC timing may be controlled to be close to top dead center to reduce the valve overlap in the sixth control region.

A system for controlling valve timing of a continuous variable valve duration engine including a turbocharger according to one form of the present disclosure may include: a data detector detecting data related to a running state of a vehicle; a camshaft position sensor detecting a position of a camshaft; an intake continuous variable valve duration (CVVD) device controlling opening duration of an intake valve of the engine; an intake continuous variable valve timing (CVVT) device controlling opening timing and closing timing of the intake valve; an exhaust continuous variable valve timing (CVVT) device controlling opening timing and closing timing of an exhaust valve of the engine; and a controller configured to classify a plurality of control regions depending on an engine speed and an engine load based on the signals from the data detector and the camshaft position sensor, and configured to control operations of the intake CVVD device, the intake CVVT device, and the exhaust CVVT device according to the control regions.

The controller applies a maximum duration to the intake valve in a first control region, maintains the maximum duration of the intake valve and controls a valve overlap by using exhaust valve closing (EVC) timing in a second control region, advances intake valve closing (IVC) timing in a third control region, controls the IVC timing to be close to bottom dead center (BDC) in a fourth control region, controls a throttle valve to be fully opened and generates a scavenging phenomenon in a fifth control region, and controls the throttle valve to be fully opened and controls the IVC timing to prevent knocking in a sixth control region.

The controller may fix intake valve opening (IVO) timing and the IVC timing and may set the EVC timing as a maximum value capable of maintaining combustion stability in the first control region.

The controller may increase the valve overlap by retarding the EVC timing until the engine load reaches a predetermined load and may reduce the valve overlap by advancing the EVC timing when the engine load is increased over the predetermined load in the second control region.

The controller may advance the IVC timing to be close to BDC when the engine speed is less than a predetermined speed and may advance the IVC timing to an angle of after BDC when the engine speed is equal to or greater than the predetermined speed in the third control region.

The controller may control intake valve opening (IVO) timing and the EVC timing to be close to top dead center (TDC) in the fourth control region.

The controller may advance intake valve opening (IVO) timing to an angle before top dead center and may control the IVC timing to an angle before BDC to generate the scavenging phenomenon in the fifth control region.

The controller may control the EVC timing within an angle range after top dead center in the fifth control region.

The controller may control the EVC timing to be close to top dead center to reduce the valve overlap in the sixth control region.

According to one form of the present disclosure, duration and timing of the continuous variable valve are simultaneously controlled, so the engine may be controlled under desirable conditions.

Opening timing and closing timing of the intake valve and the exhaust valve are appropriately controlled, the fuel efficiency under a partial load condition and power performance under a high load condition are. In addition, a fuel amount for starting may be reduced by increasing a valid compression ratio, and exhaust gas may be reduced by shortening time for heating a catalyst.

Further, a fixed cam may be used instead of a continuous variable valve duration device in the exhaust, thereby reducing the additional cost.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
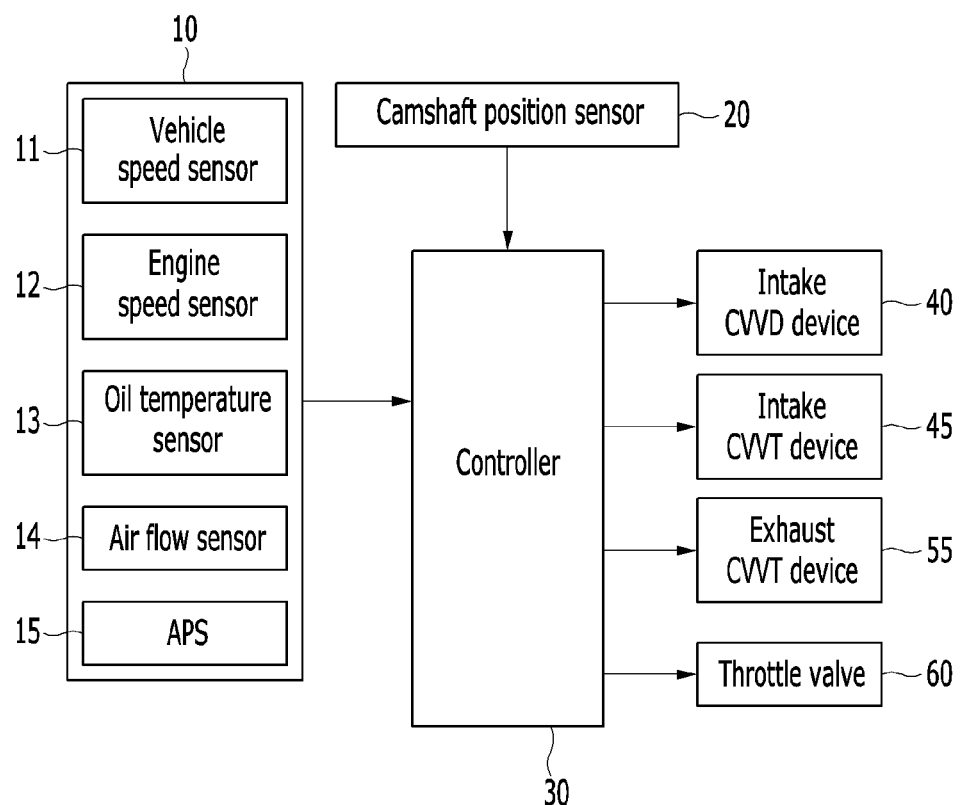
FIG. 1 is a schematic block diagram showing a system for controlling valve timing of a continuous variable valve duration engine according to one form of the present disclosure.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar terms as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example a gasoline-powered and electric-powered vehicle.

Additionally, it is understood that some of the methods may be executed by at least one controller. The term controller refers to a hardware device that includes a memory and a processor configured to execute one or more steps that should be interpreted as its algorithmic structure. The memory is configured to store algorithmic steps, and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media is stored and executed in a distributed fashion, e.g., by a telematics server or a controller area network (CAN).

FIG. 1 is a schematic block diagram showing a system for controlling valve timing of a continuous variable valve duration engine according to one form of the present disclosure.

In this form of the present disclosure, the engine as a power source of a vehicle is a turbo engine that includes a turbocharger. As shown in FIG. 1, a system for controlling valve timing of a continuous variable valve duration engine includes: a data detector 10, a camshaft position sensor 20, a controller 30, an intake continuous variable valve duration (CVVD) device 40, an intake continuous variable valve timing (CVVT) device 45, an exhaust continuous variable valve timing (CVVT) device 55, and a throttle valve 60, although other sensors or systems may be employed to detect or determine the desired data.

The data detector 10 detects data related to a running state of the vehicle for controlling the CVVD devices and the CVVT device, and includes a vehicle speed sensor 11, an engine speed sensor 12, an oil temperature sensor 13, an air flow sensor 14, and an accelerator pedal position sensor (APS) 15.

The vehicle speed sensor 11 detects a vehicle speed, and transmits a signal corresponding thereto to the controller 30. The vehicle speed sensor 11 may be mounted at a wheel of the vehicle.

The engine speed sensor 12 detects an engine speed from a change in phase of a crankshaft or camshaft, and transmits a signal corresponding thereto to the controller 30.

The oil temperature sensor (OTS) 13 detects temperature of oil flowing through an oil control valve (OCV), and transmits a signal corresponding thereto to the controller 30.

The oil temperature detected by the oil temperature sensor 13 may be determined by determining a coolant temperature using a coolant temperature sensor mounted at a coolant passage of an intake manifold Therefore, in one form, the oil temperature sensor 13 may include the coolant temperature sensor, and the oil temperature should be understood to be the coolant temperature.

The air flow sensor 14 detects an air amount flowing into the intake manifold, and transmits a signal corresponding thereto to the controller 30.

The accelerator pedal position sensor 15 detects a degree at which a driver pushes an accelerator pedal, and transmits a signal corresponding thereto to the controller 30. A position value of the accelerator pedal is 100% when the accelerator pedal is pressed fully, and the position value of the accelerator pedal is 0% when the accelerator pedal is not pressed at all.

A throttle valve position sensor that is mounted on an intake passage may be used instead of the accelerator pedal position sensor 15. Therefore, in one form, the accelerator pedal position sensor 15 may include the throttle valve position sensor, and the position value of the accelerator pedal should be understood to be an opening value of the throttle value.

The camshaft position sensor 20 detects a position of a camshaft angle, and transmits a signal corresponding thereto to the controller 30.

Figure 2:
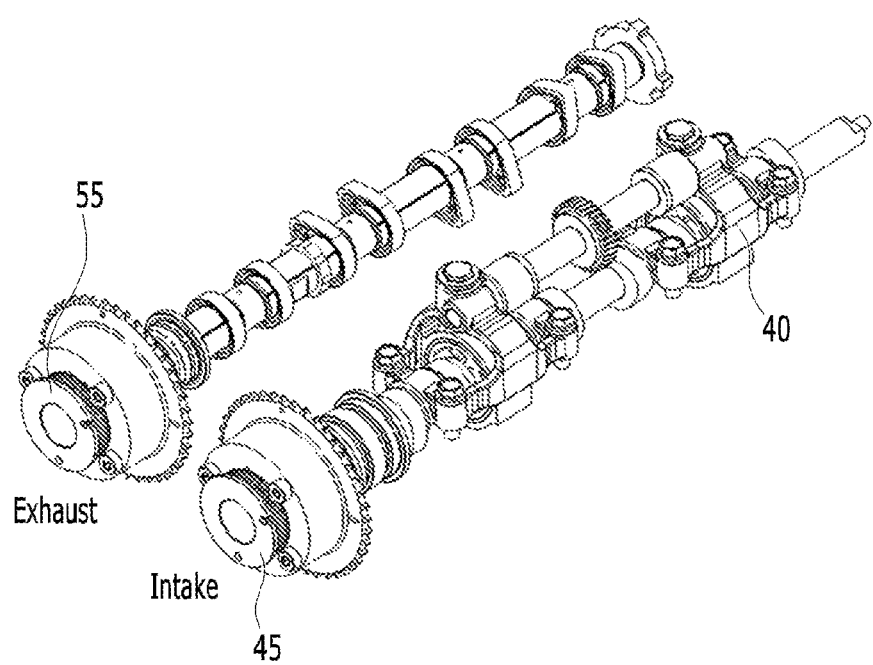
FIG. 2 is a perspective view showing an intake provided with a continuous variable valve duration device and a continuous variable valve timing device and an exhaust provided with a continuous variable valve timing device according to one form of the present disclosure.

FIG. 2 is a perspective view showing an intake provided with a continuous variable valve duration device and a continuous variable valve timing device and an exhaust provided with a continuous variable valve timing device according to one form of the present disclosure.

As shown in FIG. 2, the continuous variable valve duration device and the continuous variable valve timing device are mounted on the intake, and the continuous variable valve timing device is mounted on the exhaust through a fixed cam. Therefore, exhaust valve duration (EVD) is fixed. If the EVD becomes long, fuel efficiency and high speed performance of the vehicle may be improved, but low speed performance may be deteriorated. Thus, the EVD may be fixed at a predetermined angle of approximately 220 to 240 degrees.

The intake continuous variable valve duration (CVVD) device 40 controls opening duration of an intake valve of the engine according to a signal from the controller 30.

The intake continuous variable valve timing (CVVT) device 45 controls opening timing and closing timing of the intake valve of the engine according to a signal from the controller 30, and the exhaust continuous variable valve timing (CVVT) device 55 controls opening timing and closing timing of an exhaust valve of the engine according to a signal from the controller 30. The throttle valve 60 adjusts the air amount flowing into the intake manifold.

The controller 30 classifies a plurality of control regions depending on an engine speed and an engine load based on signals of the data detector 10 and the camshaft position sensor 20, and controls operations of the intake CVVD device 40, the intake CVVT device 45, the exhaust CVVT device 55, and the throttle valve 60. Herein, the plurality of control regions may be classified into six regions.

The controller 30 applies a maximum duration to the intake valve and limits a valve overlap in a first control region, applies the maximum duration to the intake valve and controls the valve overlap by using exhaust valve closing (EVC) timing in a second control region, advances intake valve closing (IVC) timing in a third control region, controls the IVC timing to be close to bottom dead center (BDC) in a fourth control region, generates scavenging in a fifth control region, and controls the IVC timing to prevent or inhibit knocking in a sixth control region.

For these purposes, the controller 30 may be implemented with at least one processor executed by a predetermined program, and the predetermined program may programmed in order to perform each step of a method for controlling valve timing of a continuous variable valve duration engine.

Various forms described herein may be implemented within a recording medium that may be read by a computer or a similar device by using software, hardware, or a combination thereof.

For example, the hardware described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, and electrical units designed to perform any other functions.

The software such as procedures and functions described in the present disclosure may be implemented by separate software modules. Each of the software modules may perform one or more functions and operations described in the present disclosure. A software code may be implemented by a software application written in an appropriate program language.

Hereinafter, a method for controlling valve timing of a continuous variable valve duration engine according to one form of the present disclosure will be described in detail with reference to FIG. 3A to FIG. 5C.

Figure 3A:
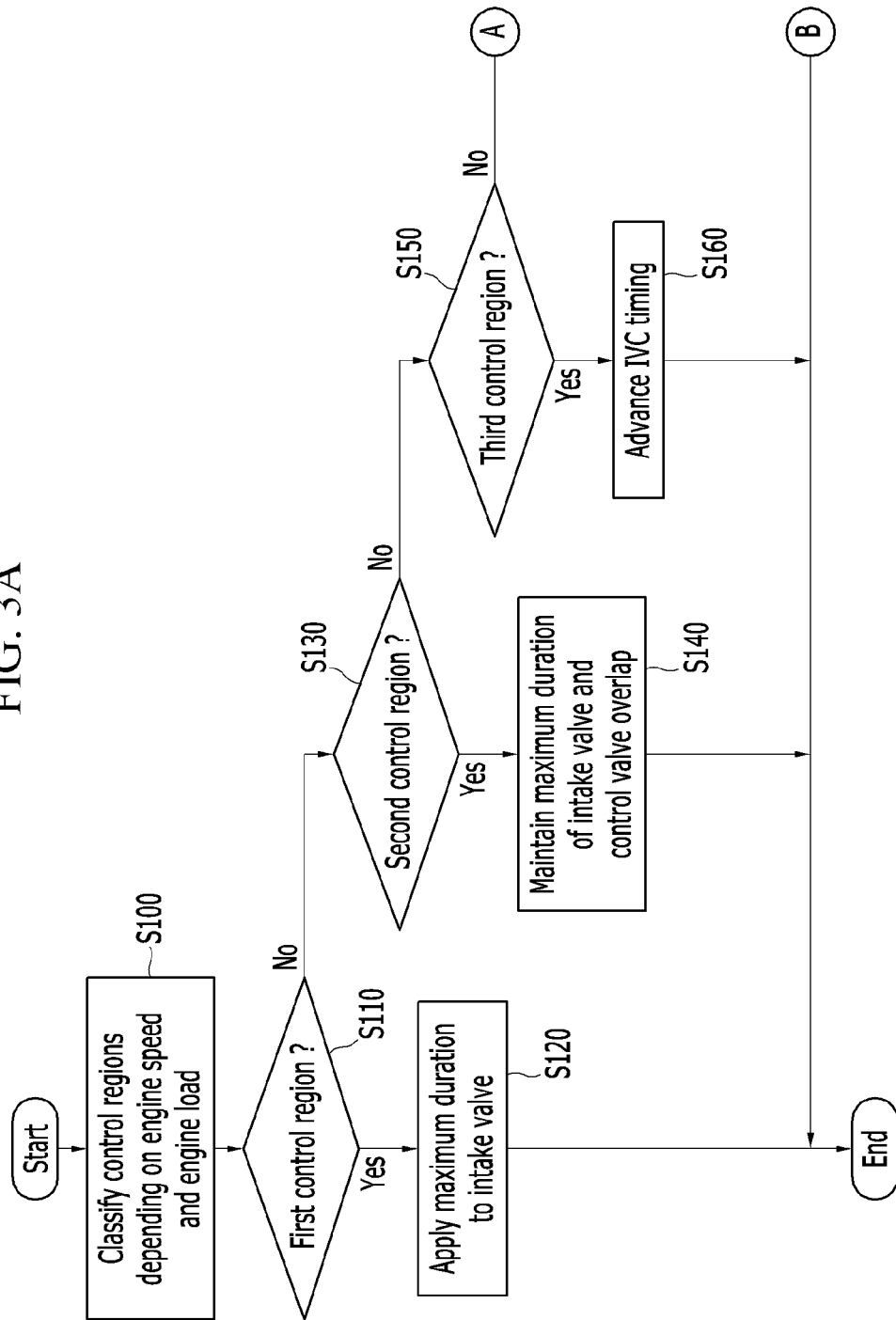
FIG. 3A and FIG. 3B are flowcharts showing a method for controlling valve timing of a continuous variable valve duration engine according to one form of the present disclosure.
Figure 3B:
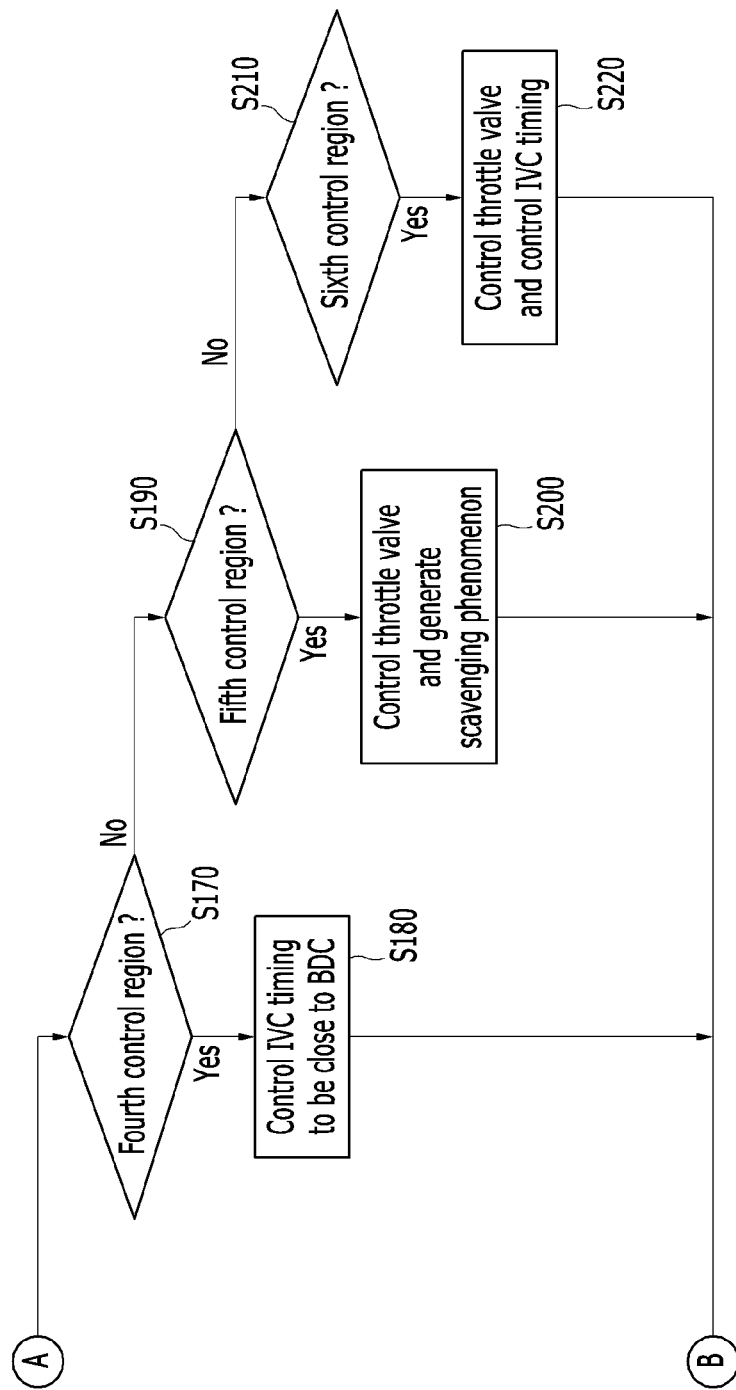
Figure 4A:
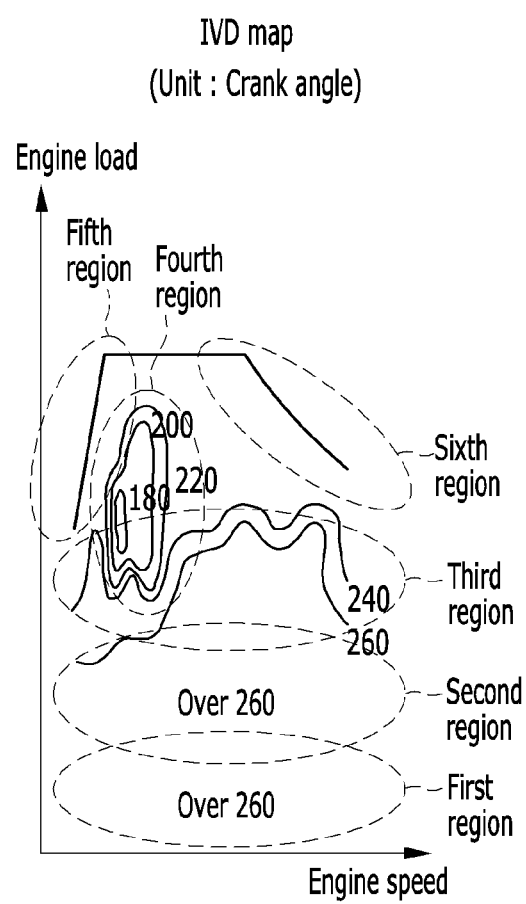
FIGS. 4A-4C are graphs showing duration, opening timing, and closing timing of an intake valve depending on an engine load and an engine speed according to the present disclosure.
Figure 4B:
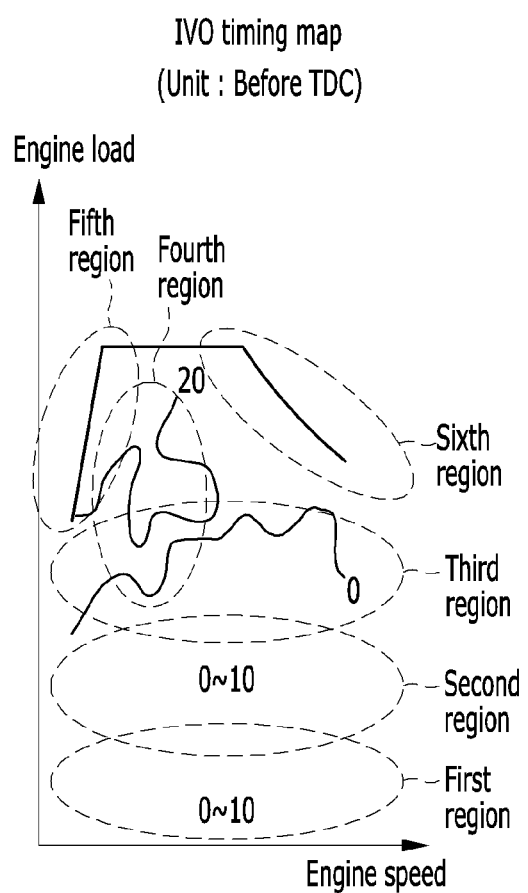
Figure 4C:
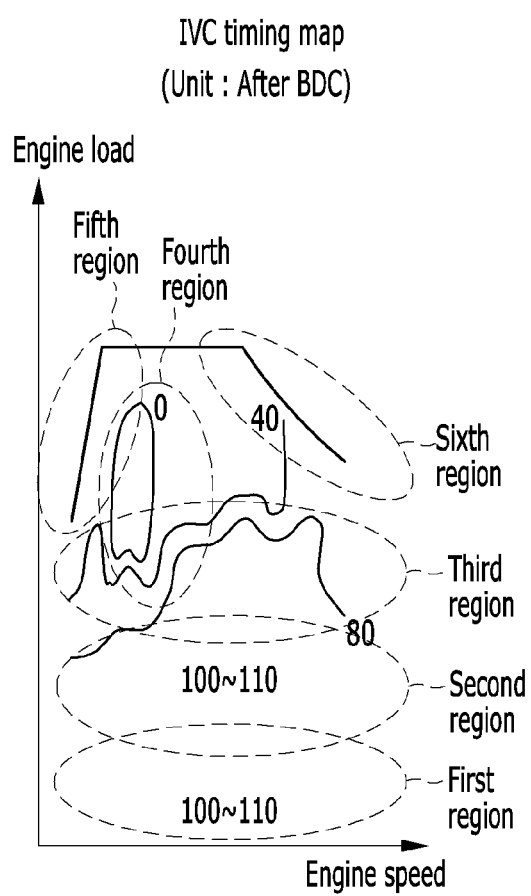
Figure 5A:
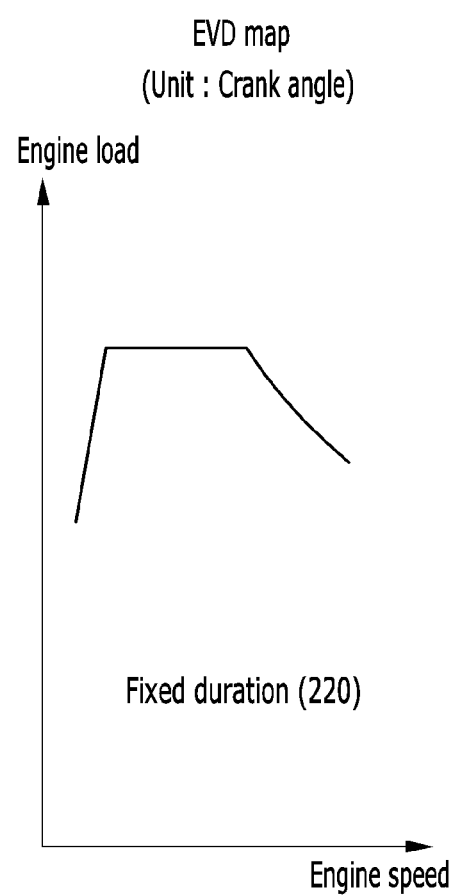
FIGS. 5A-5C are graphs showing duration, opening timing, and closing timing of an exhaust valve depending on an engine load and an engine speed according to the present disclosure.
Figure 5B:
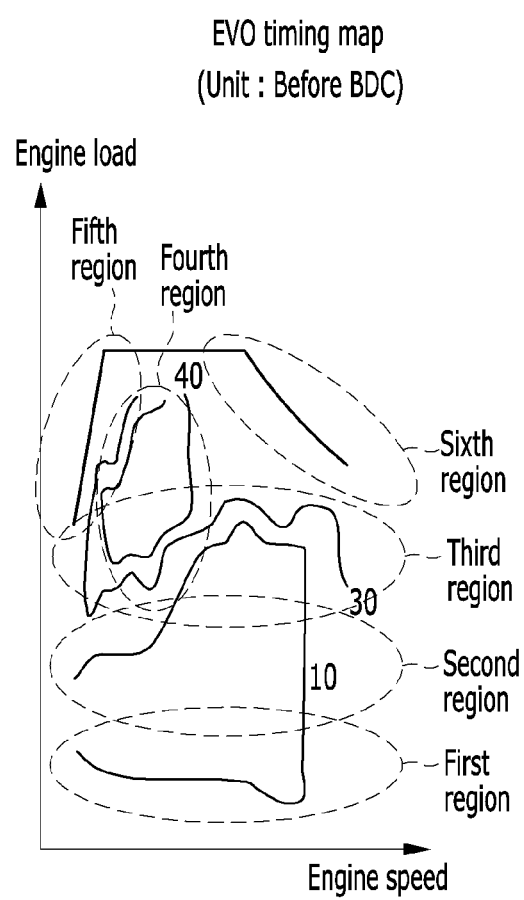
Figure 5C:
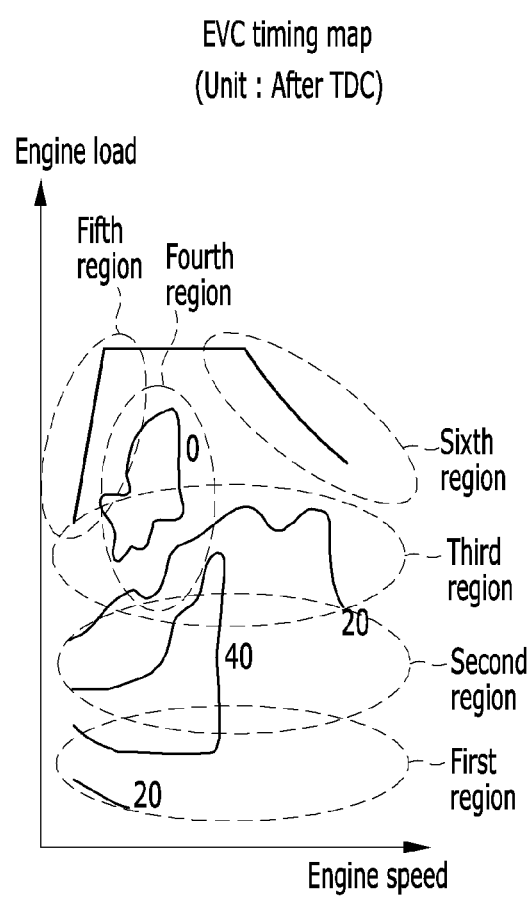

FIGS. 3A and 3B are flowcharts showing a method for controlling valve timing of a continuous variable valve duration engine. In addition, FIGS. 4A-4C are graphs showing duration, opening timing, and closing timing of an intake valve depending on an engine load and an engine speed; and FIGS. 5A-5C are graphs showing duration, opening timing, and closing timing of an exhaust valve depending on an engine load and an engine speed.

As shown in FIGS. 3A and 3B, a method for controlling valve timing of a continuous variable valve duration engine begins with classifying a plurality of control regions depending on an engine load and an engine speed at step S100. The first to sixth control regions are indicated in FIG. 4A to FIG. 5C.

The controller 30 may classify control regions as a first control region when the engine load is less than a first predetermined load, a second control region when the engine load is equal to or greater than the first predetermined load and less than a second predetermined load, and a third control region when the engine load is equal to or greater than the second predetermined load and less than a third predetermined load. In addition, the controller 30 may classify control regions as a fourth control region when the engine load is equal to or greater than the second predetermined load and the engine speed is equal to or greater than a first predetermined speed and less than a second predetermined speed, a fifth control region when the engine load is equal to or greater than the third predetermined load and the engine speed is less than the first predetermined speed, and a sixth control region when the engine load is equal to or greater than the third predetermined load and the engine speed is equal to or greater than the second predetermined speed.

Meanwhile, as shown in FIG. 4A to FIG. 5C, a crank angle is indicated in an intake valve duration (IVD) map and an exhaust valve duration (EVD) map. For example, regarding the IVD map, a curved line indicated by '200' in the fourth control region means that the crank angle is approximately 200 degrees, and a curved line indicated by '220' means that the crank angle is approximately 220 degrees. Although not illustrated in the drawings, a curved line having a crank angle between approximately 200 and 220 degrees may exist between the curved lines.

In addition, a number designated in an intake valve opening (IVO) timing map represents before a top dead center (TDC), a number designated an intake valve closing (IVC) timing map represents after a bottom dead center (BDC), a number designated in an exhaust valve opening (EVO) timing map represents before BDC, and a number designated in an exhaust valve closing (EVC) timing map represents after TDC.

Regions and curved lines shown in FIG. 4A to FIG. 5C are just examples for describing one form of the present disclosure, and the present disclosure is not limited thereto.

When the control regions are classified depending on the engine load and the engine speed at step S100, the controller 30 determines whether a current engine state belongs to the first control region at step S110.

When the engine load is less than the first predetermined load at step S110, the controller 30 determines that the current engine state belongs to the first control region. In this case, the controller 30 applies the maximum duration to the intake valve and controls the valve overlap between the exhaust valve and the intake valve at step S120. The valve overlap represents a state in which the intake valve is opened and the exhaust valve is not yet closed.

In other words, when the engine is operated at a low load condition, the controller 30 may fix the IVO timing and the ICV timing to apply the maximum duration to the intake valve. As shown in FIG. 4B, the IVO timing may be fixed at an angle of approximately 0 to 10 degrees before TDC, and the IVC timing may be fixed at an angle of approximately 100 to 110 degrees after BDC.

In addition, the controller 30 may set the EVC timing as a maximum value capable of maintaining combustion stability by moving the EVC timing in an after TDC direction.

When the current engine state does not belong to the first control region at step S110, the controller 30 determines whether the current engine state belongs to the second control region at step S130.

When the engine load is equal to or greater than the first predetermined load and is less than the second predetermined load at step S130, the controller 30 determines that the current engine state belongs to the second control region. In this case, the controller 30 maintains the maximum duration of the intake valve and controls the valve overlap by using the EVC timing at step S140.

In other words, the controller 30 may increase the valve overlap by retarding the EVC timing in the after TDC direction until the engine load reaches a predetermined load. When the EVC timing is retarded in the after TDC direction, as the valve overlap is increased, intake pumping may be decreased, however, since the exhaust valve duration (EVD) is fixed, exhaust pumping may be increased as the EVO timing approaches BDC. Accordingly, when the engine load is increased over the predetermined load, the controller 30 may reduce the valve overlap by advancing the EVC timing toward a locking position.

In addition, the controller 30 may apply the maximum duration to the intake valve to prevent or inhibit knocking according to an increase of the engine load, and maintain a late intake valve close (LIVC) position at the angle of approximately 100 to 110 degrees after BDC.

When the current engine state does not belong to the second control region at step S130, the controller 30 determines whether the current engine state belongs to the third control region at step S150.

When the engine load is equal to or greater than the second predetermined load and is less than the third predetermined load, the controller 30 determines that the current engine state belongs to the third control region. In this case, the controller 30 advances the IVC timing at step S160.

As described above, the IVC timing is controlled to be at the LIVC position in the first control region and the second control region. When the IVC timing is positioned at the LIVC position, as the engine load is increased, boost pressure may be increased, knocking may occur, and fuel efficiency may be deteriorated. In order to prevent or reduce the aforementioned phenomenon, the controller 30 advances the IVC timing in the third control region where the engine load is relatively large.

In this case, so as to reflect characteristics of the turbo engine, the controller 30 may rapidly advance the IVC timing to be close BDC when the engine speed is less than a predetermined speed, and may slowly advance the IVC timing to an angle of approximately 30 to 50 degrees after BDC when the engine speed is equal to or greater than the predetermined speed. The predetermined speed may be approximately 1500 rpm.

When the current engine state does not belong to the third control region at step S150, the controller 30 determines whether the current engine state belongs to the fourth control region at step S170.

When the controller 30 determines that the current engine state belongs to the fourth control region at step S170, the controller 30 controls the IVC timing to be close to bottom dead center (BDC) at step S180.

The fourth control region may be a low boost region at which the engine load is equal to or greater than the second predetermined load and the engine speed is equal to or greater than the first predetermined speed and less than the second predetermined speed. For example, the first predetermined speed may be approximately 1500 rpm, and the second predetermined speed may be approximately 2500 rpm.

The controller 30 controls the IVC timing to be close to BDC, thereby improving fuel efficiency. In addition, the valve overlap may be reduced by controlling the IVO timing and the EVC timing to be close to TDC, thereby improving combustion stability. Accordingly, short intake duration (e.g., approximately 180 degrees) may be used in the fourth control region.

When the current engine state does not belong to the fourth control region at step S170, the controller 30 determines whether the current engine state belongs to the fifth control region at step S190.

When the engine load is equal to or greater than the third predetermined load and the engine speed is less than the first predetermined speed at step S190, the controller 30 determines that the current engine state belongs to the fifth control region. In this case, the controller 30 controls the throttle valve 60 to be fully opened and generates a scavenging phenomenon in which combustion gas is emitted due to reduction of exhaust port pressure at step S200.

In the turbo engine, when the throttle valve is fully opened (i.e., WOT; Wide Open Throttle) in the fifth control region at which the engine speed is less than the first predetermined speed (e.g., approximately 1500 rpm), intake pressure becomes higher than the exhaust port pressure. Therefore, the scavenging phenomenon occurs easily compared to a naturally aspirated engine. The controller 30 may advance the IVO timing to an angle of approximately 20 to 40 degrees before TDC and may control the IVC timing to an angle of approximately 0 to 20 degrees after BDC to generate the scavenging phenomenon.

In addition, the controller 30 may sufficiently retard the EVO timing in the after BDC direction to maximize the scavenging phenomenon. Since the exhaust duration is fixed in one form of the present disclosure, when the EVC timing is controlled to be retarded over approximately 30 degrees after TDC, a catalyst temperature may be rapidly increased. Accordingly, the controller 30 may control the EVC timing within an angle range of approximately 30 degrees after TDC to maintain the catalyst temperature.

When the current engine state does not belong to the fifth control region at step S190, the controller 30 determines whether the current engine state belongs to the sixth control region at step S210.

When the engine load is equal to or greater than the third predetermined load and the engine speed is equal to or greater than the second predetermined speed, the controller 30 determines that the current engine state belongs to the sixth control region. In this case, the controller 30 controls the throttle valve 60 to be fully opened and controls the IVC timing to prevent or inhibit the knocking at step S220.

When the engine speed is equal to or greater than the second predetermined speed (e.g., approximately 3500 rpm), since the exhaust port pressure is significantly greater than the intake port pressure, the scavenging phenomenon disappears or is reduced. Accordingly, the controller 30 controls the EVC timing to be close to TDC to prevent exhaust pumping, and the valve overlap is reduced. In this case, since the exhaust duration is fixed and the EVO timing is advanced to an angle of approximately 30 degrees before BDC, the EVC timing may be controlled to be close to TDC.

Meanwhile, when WOT control is performed at a high speed condition, the knocking hardly occurs in the naturally aspirated engine, but on the contrary, the knocking easily occurs in the turbo engine. Accordingly, the controller 30 advances the IVC timing within an angle range of approximately 50 degrees after BDC to reduce boost pressure such that the knocking is prevented or inhibited.

As described above, according to one form of the present disclosure, duration and timing of the continuous variable valve are simultaneously controlled, so the engine may be controlled under desirable conditions.

While this disclosure has been described in connection with what is presently considered to be practical forms, it is to be understood that the disclosure is not limited to the disclosed forms, but, on the contrary, is intended to cover various modifications and equivalent arrangements included within the spirit and scope of the present disclosure.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. A method for controlling valve timing of a turbo engine provided with a continuous variable valve duration (CVVD) device and a continuous variable valve timing (CVVT) device at an intake and a continuous variable valve timing (CVVT) device at an exhaust, the method comprising:

classifying, by a controller, a plurality of control regions including first, second, third, fourth, fifth and sixth control regions depending on an engine speed and an engine load;

applying, by the controller, a maximum duration to an intake valve in the first control region;

maintaining, by the controller, the maximum duration of the intake valve and controlling a valve overlap by using an exhaust valve closing (EVC) timing in the second control region;

advancing, by the controller, an intake valve closing (IVC) timing in the third control region;

controlling, by the controller, the IVC timing to be closer to a bottom dead center (BDC) in the fourth control region than in the first to third control regions;

controlling, by the controller, a throttle valve to be fully opened and controlling an intake valve opening (IVO) timing and the IVC timing to generate a scavenging phenomenon in the fifth control region; and controlling, by the controller, the throttle valve to be fully opened and controlling the IVC timing to inhibit knocking in the sixth control region, wherein the IVO timing and the IVC timing are fixed and the EVC timing is set as a maximum value capable of maintaining combustion stability in the first control region, wherein the valve overlap is increased by retarding the EVC timing until the engine load reaches a predetermined load and the valve overlap is reduced by advancing the EVC timing when the engine load is increased over the predetermined load in the second control region, wherein the IVC timing is advanced to become closer to the BDC when the engine speed is less than a predetermined speed and the IVC timing is advanced to an angle after the BDC when the engine speed is equal to or greater than the predetermined speed in the third control region, wherein the IVO timing and the EVC timing are controlled to be closer to a top dead center in the fourth control region than in the first to third control regions, wherein the IVO timing is advanced to an angle before the top dead center and the IVC timing is controlled to an angle after the BDC to generate the scavenging phenomenon in the fifth control region, wherein the EVC timing is controlled within an angle range after the top dead center in the fifth control region, and the EVC timing is controlled to be closer to the top dead center to reduce the valve overlap in the sixth control region than in the fifth control region.

2. A system for controlling valve timing of a continuous variable valve duration engine including a turbocharger, the system comprising:

a data detector configured to detect data related to a running state of a vehicle;

a camshaft position sensor configured to detect a position of a camshaft;

an intake continuous variable valve duration (CVVD) device configured to control opening duration of an intake valve of the engine;

an intake continuous variable valve timing (CVVT) device configured to control opening timing and closing timing of the intake valve;

an exhaust continuous variable valve timing (CVVT) device configured to control opening timing and closing timing of an exhaust valve of the engine; and a controller configured to classify a plurality of control regions including first, second, third, fourth, fifth and sixth control regions depending on an engine speed and an engine load based on signals from the data detector and the camshaft position sensor, and configured to control operations of the intake CVVD device, the intake CVVT device, and the exhaust CVVT device according to the plurality of control regions, wherein the controller is configured to:
apply a maximum duration to the intake valve in the first control region,
maintain the maximum duration of the intake valve and control a valve overlap by using an exhaust valve closing (EVC) timing in the second control region,
advance an intake valve closing (IVC) timing in the third control region,
control the IVC timing to be closer to a bottom dead center (BDC) in the fourth control region than in the first to third control regions,
control a throttle valve to be fully opened and an intake valve opening (IVO) timing and the IVC timing to generate a scavenging phenomenon in the fifth control region, and
control the throttle valve to be fully opened and the IVC timing to inhibit knocking in a sixth control region, wherein the controller is configured to fix the IVO timing and the IVC timing and configured to set the EVC timing as a maximum value capable of maintaining combustion stability in the first control region, wherein the controller is configured to increase the valve overlap by retarding the EVC timing until the engine load reaches a predetermined load and configured to reduce the valve overlap by advancing the EVC timing when the engine load is increased over the predetermined load in the second control region, wherein the controller is configured to advance the IVC timing to become closer to the BDC when the engine speed is less than a predetermined speed and configured to advance the IVC timing to an angle of after the BDC when the engine speed is equal to or greater than the predetermined speed in the third control region, wherein the controller is configured to control the IVO timing and the EVC timing to be closer to a top dead center (TDC) in the fourth control region than in the first to third control regions, wherein the controller is configured to advance IVO timing to an angle before the TDC and configured to control the IVC timing to an angle before the BDC to generate the scavenging phenomenon in the fifth control region, wherein the controller is configured to control the EVC timing within an angle range after the TDC in the fifth control region, and wherein the controller is configured to control the EVC timing to be closer to the TDC to reduce the valve overlap in the sixth control region than in the fifth control region.

* * * * *